Patented Sept. 4, 1951

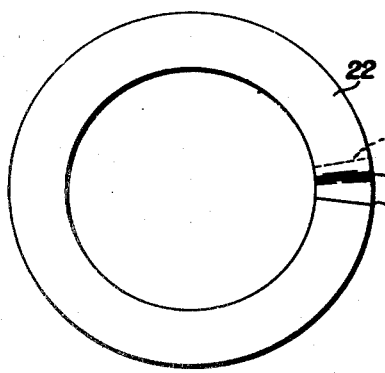

2,566,448

UNITED STATES PATENT OFFICE 2,566,448

ANTIFRICTION BEARING ASSEMBLY SEALING MEANS

Ralph M. Heintz, Cleveland, and Walter T. Buhl, Shaker Heights, Ohio, assignors, by mesne assignments, to Jack & Heintz Precision Industries, Inc., Cleveland, Ohio, a corporation of Delaware Application February 24, 1945, Serial No. 579,520

1 Claim. (Cl. 288—3)

This invention relates in general to bearing assemblies and more particularly to lubricant sealing means therefor.

It is particularly true in high speed rotating masses where precision is demanded that extreme care must be taken in the construction of the bearing races and the selection of the ball bearings and that a seal be provided not only to retain the bearing lubricant but also insure against any dirt or foreign matter infiltrating into the lubricant.

It is therefore one of the primary objects of this invention to provide a ball bearing assembly and removable seal therefor that will be so simple in construction and inexpensive of manufacture that it will lend itself to mass production and to ease of assembly and disassembly and at the same time be highly efficient as a lubricant retaining and protecting seal.

To this end it is proposed to provide the outer ball race with inner retaining flanges on either side of the anti-friction bearings. The seal itself preferably comprises a split light weight centrally apertured ring of springy material which when ready for assembly in the bearing races will be in the form of a single piece of springy material so constructed that the space between its two disconnected ends will be completely overlapped by the body portion of the seal for sealing purposes. Several methods of making such a seal will be described hereinafter in greater detail. The snap engagement of the seal by the retaining flanges effects a highly efficient fool-proof removable seal.

With the foregoing and other objects in view, the invention resides in the combination of parts and in the details of construction hereinafter set forth in the following specification and appended claim, certain embodiments thereof being illustrated in the accompanying drawings, in which:

Figure 1 is a plan view of one form of seal comprised of two substantially circular split rings with the end of one joined rigidly to an end of the other;

Figure 2 is an end view of the form shown in Figure 1;

Figure 3 is a view in perspective cross section showing a bearing assembly with a seal of the type of Figures 1 and 2 installed therein;

Figure 4 is a plan view of an S-strip of material prior to bending the same to form a double thickness seal;

Figure 5 is an end view of the same form as Figure 4 after bending into a double thickness seal;

Figure 6 is a plan view of a spiral seal of substantially two convolutions, or of double thickness; and Figure 7 is an end view of the form shown in Figure 6.

As is customary practice the ball bearings are packed with lubricant and the problem has been to provide a removable seal for retaining the lubricant and preventing the infiltration of dirt or foreign matter into the lubricant and ball bearings. The prevention of escape of the lubricant is important to insure the presence of sufficient lubricant for lubricant purposes. Of equal importance it is to effectively seal the assembly against the leakage of dirt or foreign matter from the outside into the lubricant and onto the balls. Even if these foreign particles are of such nature that they in and of themselves would not have any serious effect on the surfaces of the balls and races, their presence would bring about an oxidation that would destroy the lubricating characteristics of the lubricant.

Accordingly, the present invention contemplates the use of a single light weight sealing ring of metal, or other springy material, that is centrally apertured to surround the inner race with clearance and when installed in the bearing assembly has its two ends overlapping so that the space between the two ends will be overlapped by the body portion of the ring to constitute a seal. Such a sealing ring assembly is preferably arranged on either side of the ball, or roller, bearings.

This is a departure from the use of the conventional split circular ring necessitating the use of absorbent sealing material or the fabrication and use of two separate split rings that are separately installed in overlapping relationship so that the split portion of each is overlapped and sealed by the body portion of the other.

There are several methods of making such a continuous single piece sealing device. One is to fabricate a spiral piece of two or less but more than one complete convolution so that when installed in the bearing assembly the space between the two ends of the sealing ring will be overlapped by the body portion of the ring. As stated before, the ring is made of metal, or other springy material, so that it will act as a snap ring in assembly and disassembly into and out of the space between the inner and outer race of the anti-friction bearing assembly.

Another method of fabrication is the making of two split rings of slightly less than complete circular dimensions, joining one end of one ring rigidly with one end of the other and placing the same in the bearing assembly so that the space between the two free ends is overlapped by the double thickness of the body portion of the seal.

Another method of fabrication is the making of a strip in substantially S-form, bending the two loops of the S transversely to make a double thickness ring in which the space between the two ends is overlapped by the body portion of the sealing ring.

In all three methods mentioned one of the overlapping body portions of the double thickness single piece may be preferably slightly offset to more readily provide flatwise contact of the two thicknesses of material.

Referring more particularly to the drawings, one form of the invention may comprise the taking of two sealing rings that are split in somewhat the same manner as those disclosed in the co-pending application for United States Letters Patent of Ralph M. Heintz for Bearing Housings, Serial Number 511,523, filed November 24, 1943, now abandoned. Instead of employing these two separate rings, however, it is proposed to join the two together substantially coextensively to form a unitary piece. In Figure 1 the one ring 1 is shown with space 2 between its two ends 3 and 4. The lower ring 5 is spot welded, as shown in dotted lines at 6, or otherwise connected, either edgewise or in slightly overlapping relationship to ring 5. Ring 5 is also split with a space 7 between its two ends 8 and 9, as shown in dotted lines. The split, or space, 2 between the two ends 3 and 4 is overlapped and sealed by the now unitary rigidly added portion 5 of the double thickness ring and the split, or space, 7 between the former ends 8 and 9 of the newly rigidly added portion 5 is overlapped and sealed by the body of ring portion 1.

Figure 3 shows a conventional anti-friction bearing assembly with an inner race 10 and an outer race 11 with anti-friction bearings, such as ball bearings, 12 maintained peripherally spaced by a cage 13. The inner race 10 has appropriate grooves 14 and the outer race 11 has appropriate grooves 15 on either side of the ball bearings to receive the single piece continuous double thickness seal, as shown in Figure 3.

In Figures 4 and 5 is shown another method of forming a continuous single piece double thickness seal for the same installation in the anti-friction bearing assembly of Figure 3 for the same purpose. Here there is stamped out of springy metal, or other material, a continuous S-shaped piece with two loop portions 16 and 17 having ends 16A and 17A and which are subsequently folded along dotted line 18 to form the same in the manner shown in Fig. 5.

In Figures 6 and 7 is illustrated another method of forming a continuous single piece double thickness seal for the same installation in the same anti-friction bearing assembly for the same purpose. Here there may be wound out of a piece of springy metal, or other material, a continuous spiral piece with ends 19 and 20 and in which the two convolutions are joined together by an integral offset portion 21 between the two thicknesses of material 22 and 23. It will be readily seen that the space between the adjacent ends 19 and 20 is completely sealed by the offset portion 21. The length of the spiral and the space between the ends may be varied and the offset portion is optional but probably preferable for assembly purposes.

From the foregoing it will be seen that there has been provided a continuous single piece seal of substantially double thickness and made of springy metal, or other material, which lends itself to ready assembly in and disassembly from an anti-friction bearing assembly and which constitutes a complete and efficient seal without the need of absorbent or other additional sealing material.

We claim:

For use in an anti-friction bearing having an inner and an outer race, opposed bearing rolling element surfaces and opposed notches, a sealing member comprising a single strip of springy material with two free ends and the strip being of such predetermined length with respect to the circumferential lengths of said notches that when said sealing strip is fed endwise into said notches the strip resiliently expands into said outer race notch and the two free ends of the strip are flat and circumferentially spaced from each other with one complete convolution of the strip between said two ends.

RALPH M. HEINTZ.
WALTER T. BUHL.

REFERENCES CITED

The following references are of record in the file of this patent:

UNITED STATES PATENTS

| Number | Name | Date |
|---|---|---|
| 719,101 | Folant | Jan. 27, 1903 |
| 1,103,912 | Dunham | July 14, 1914 |
| 1,901,580 | Bott | Mar. 14, 1933 |
| 1,989,980 | Hamer | Feb. 5, 1935 |
| 2,040,489 | Large | May 12, 1936 |
| 2,240,624 | Marien | May 6, 1941 |